US011597047B2

United States Patent
Kipke et al.

(10) Patent No.: US 11,597,047 B2
(45) Date of Patent: Mar. 7, 2023

(54) DEVICE FOR CLAMPING A ROTATABLY MOUNTED SHAFT ELEMENT, IN PARTICULAR FOR USE ON A MACHINE TOOL, AND AXIS STRUCTURE OF A MACHINE TOOL

(71) Applicant: DECKEL MAHO PFRONTEN GMBH, Pfronten (DE)

(72) Inventors: Stefan Kipke, Durach (DE); Frank Mathias Gänßle-Klenk, Nesselwang (DE)

(73) Assignee: DECKEL MAHO PFRONTEN GMBH, Pfronten (DE)

( * ) Notice: Subject to any disclaimer, the term of this patent is extended or adjusted under 35 U.S.C. 154(b) by 776 days.

(21) Appl. No.: 16/614,745

(22) PCT Filed: May 16, 2018

(86) PCT No.: PCT/EP2018/062740
§ 371 (c)(1),
(2) Date: Nov. 18, 2019

(87) PCT Pub. No.: WO2018/210932
PCT Pub. Date: Nov. 22, 2018

(65) Prior Publication Data
US 2020/0086442 A1    Mar. 19, 2020

(30) Foreign Application Priority Data

May 17, 2017 (DE) .................... 10 2017 208 348.4
Aug. 17, 2017 (DE) .................... 10 2017 214 362.2

(51) Int. Cl.
*B23Q 16/10*    (2006.01)
*F16B 1/00*    (2006.01)

(52) U.S. Cl.
CPC .......... *B23Q 16/102* (2013.01); *B23Q 16/10* (2013.01); *B23Q 2220/004* (2013.01); *F16B 1/005* (2013.01); *F16B 1/0057* (2013.01)

(58) Field of Classification Search
CPC ...... B23Q 16/102; B23Q 11/00; B23Q 16/10; B23Q 11/0092; B23Q 16/105; B23Q 2220/004; F16B 1/005; F16B 1/0057
See application file for complete search history.

(56) References Cited

U.S. PATENT DOCUMENTS 3,772,961 A * 11/1973 Siebert ................. F16C 29/025
                                                    384/100
5,239,892 A *  8/1993 Sakai ....................... B23Q 1/52
                                                    384/100
(Continued)

FOREIGN PATENT DOCUMENTS

DE        103 19 139 A1    11/2004
DE    102005062520 A1 *    6/2007   ............. B23Q 1/287
(Continued)

OTHER PUBLICATIONS

Jul. 12, 2018 Office Action issued in German Patent Application No. 10 2017 214 362.2.
(Continued)

*Primary Examiner* — Sara Addisu
(74) *Attorney, Agent, or Firm* — Oliff PLC (57) ABSTRACT

A device for clamping a rotatably mounted shaft element including: a housing element having an annular housing portion wherein the shaft extends in the axial direction; an elastically deformable annular clamping ring element arranged in the annular housing portion, wherein the clamping ring has a cross-sectional profile with a first profile portion, extending radially inward and protrudes radially through an annular circumferential opening; and a pressure chamber formed in the annular housing has at least one
(Continued)

pressure chamber portion arranged radially on the inner side adjacently to at least one second profile portion of the clamping ring; wherein the rotatably mounted shaft in a rest state clamped by frictional engagement with the first profile of the clamping ring protruding toward the shaft, and wherein the frictional engagement between the shaft and the first profile is releasable, the clamping ring is elastically deformable radially outward by pneumatic or hydraulic pressure chamber.

14 Claims, 5 Drawing Sheets

(56) References Cited

U.S. PATENT DOCUMENTS

| | | | | |
|---|---|---|---|---|
| 8,028,605 | B2* | 10/2011 | Duane | B23Q 11/127 74/813 L |
| 8,544,363 | B2* | 10/2013 | Tatsuda | B23Q 16/105 74/813 L |
| 10,427,265 | B2* | 10/2019 | Tachiki | B23Q 16/105 |
| 2010/0123278 | A1* | 5/2010 | Tatsuda | B23Q 16/102 269/57 |

FOREIGN PATENT DOCUMENTS

| | | |
|---|---|---|
| DE | 10 2009 031 027 A1 | 1/2011 |
| DE | 10 2013 012 765 A1 | 2/2015 |
| EP | 1 088 616 A2 | 4/2001 |
| EP | 2 189 241 A1 | 5/2010 |

OTHER PUBLICATIONS

Sep. 12, 2018 International Search Report issued in International Patent Application No. PCT/EP2018/062740.

Mar. 30, 2021 Office Action issued in Chinese Patent Application No. 201880040169.6.

* cited by examiner

DEVICE FOR CLAMPING A ROTATABLY MOUNTED SHAFT ELEMENT, IN PARTICULAR FOR USE ON A MACHINE TOOL, AND AXIS STRUCTURE OF A MACHINE TOOL

This invention relates to a device for clamping a rotatably mounted shaft element, in particular for use on a machine tool. In particular, the present invention relates to a device (clamping device or safety clamping device) for clamping or safety clamping a rotatably mounted shaft element, in particular a shaft element of a pivot or rotary axis of a machine tool.

Furthermore, the present invention relates to an axis structure of a machine tool comprising such a device for clamping a rotatably mounted shaft element.

BACKGROUND OF THE INVENTION

Machine tools, in particular numerically controlled machine tools, with several controllable axes are known in the prior art. A machine tool axis is a unit of a machine tool which controls a relative movement of a tool relative to a workpiece to be machined with the tool. On the one hand, machine tools can include one or more linear axes to control a relative movement of a tool relative to a workpiece to be machined with the tool in a respective linear direction. In addition, such machine tools can comprise so-called pivot or rotary axes to control a relative rotational or pivoting movement of the tool relative to the workpiece to be machined with the tool about a rotary or pivot axis.

On the one hand, on milling machines, universal machine tools or machining centers, for example, pivot or rotary axes are known by means of which a work spindle carrying the tool can be pivoted or rotated relative to the workpiece about a pivot or rotary axis. Furthermore, turntables, rotary tables or rotating tool tables are known on milling machines, universal machine tools or machining centers, for example, on which a workpiece can be clamped and by means of which the workpiece clamped on the tool table can be pivoted or rotated about a pivot or rotary axis. In addition, work spindles are known on machine tools that carry a workpiece or a tool and are adapted to rotate the clamped tool or workpiece about the spindle axis by means of a spindle shaft driven by a spindle motor. In addition, rotating spindle or tool turrets are known on lathes or turning centers which hold a plurality of spindles or tools and can be rotated about a turret axis.

All the above-mentioned turrets, rotary or pivot axes or spindles have in common that there is at least one rotatably mounted shaft element which can be driven rotatably about the rotary axis or shaft by means of a drive or axis drive.

In particular in larger and more massive pivot or rotary axis structures, it is provided on machine tools that the rotatably mounted shaft element can be fixed in the non-driven, stationary state, in particular also for safety reasons. In particular, it is provided that such a fixation, clamping or safety clamping of a rotatably mounted shaft element can be precisely clamped or released, preferably without a time delay in activation or clamping. On the other hand, it is provided that the safety clamping in clamped condition with simple and preferably cost-reduced structure nevertheless allows a high level of safety or a fixed clamping which in particular still guarantees a safe and torque-proof clamping up to very high torques of preferably more than 1000 Nm.

For the above mentioned reasons, it is an object of the present invention to provide a device, in particular for use on a machine tool, for clamping a rotatably mounted shaft or shaft element, in particular for use on a rotary or pivot axis of a machine tool which, with a simple, space-saving and cost-reducing structure, nevertheless allows precisely controllable clamping with simultaneously high clamping performances.

SUMMARY OF THE INVENTION

According to the present invention, a device for clamping a rotatably mounted shaft element is proposed according to independent claim 1. Dependent claims concern preferred or exemplary embodiments of the present invention.

According to one aspect of the present invention, a device is proposed for clamping a rotatably mounted shaft element which may include the features described below.

The device includes a housing element which preferably has an annular housing portion or is preferably of annular configuration, wherein the rotatably mounted shaft element can be arranged extending in an axial direction through an inner region of the annular housing or housing portion.

The device includes an elastically deformable annular clamping ring element arranged in the housing element or the annular housing portion of the housing element.

The clamping ring element comprises a cross-sectional profile with a first profile portion which extends radially inward and which protrudes radially, in particular through a circumferential, in particular annularly circumferential, opening of the housing or annular housing portion towards the rotatably mounted shaft element, and at least one second profile portion which extends transversely to the first profile portion, in particular axially or in the axial direction.

The device comprises a pressure chamber which is formed in the housing element or the annular housing portion of the housing element, and preferably comprises at least one pressure chamber portion which is preferably arranged radially on the inner side adjacently to the at least one second profile portion of the clamping ring element.

The rotatably mounted shaft element in a rest state of the clamping ring element can be clamped by frictional engagement with the first profile portion of the clamping ring element protruding toward the shaft element, and the frictional engagement between the shaft element and the first profile portion is releasable in order to release the clamping of the shaft element, preferably by the clamping ring element being elastically deformable or being deformed radially outward by pneumatic and/or hydraulic pressure application to the pressure chamber.

This results in the advantage that the shaft or the rotatably mounted shaft element is clamped via the clamping ring element in the rest state without applied pressure in the pressure chamber. In addition, there is an advantage of a very efficient safety function, since automatic safety clamping of the shaft element can be guaranteed without delay in the event of failure of the pneumatic or hydraulic system or in the event of leaks or an undesirable drop in system pressure, for example to ambient pressure (e.g. external air pressure).

In addition, this results in the advantage that by applying pressure in the pressure chamber without delays due to elastic deformation of the clamping ring element in the radial outward direction, it is possible to clamp the rotatably mounted shaft element quickly, easily and efficiently without delay.

Furthermore, the device can be provided in a simple, cost-reduced and compact structure in both radial and axial directions, and simple and efficient maintenance can be made possible.

In preferred exemplary embodiments, in the rest state of the clamping ring element, an inner diameter on the first profile portion is smaller than an outer diameter of a circumferential contact portion of the shaft element or of a ring element fixed to the shaft element in a torque-proof manner, which ring element, in particular, can be configured preferably as a full ring element or as a plurality of ring segment elements. Preferably, the first profile portion of the clamping ring element is pressed or presses against the shaft element for a frictional engagement on the circumferential contact portion of the shaft element or on the ring element which is fixed in a torque-proof manner on the shaft element or on its ring element segments.

In preferred exemplary embodiments, the device includes a connection connectable to a pneumatic and/or hydraulic system, preferably connected to the pressure chamber via one or more fluid lines formed in the annular housing portion of the housing element for pressure application.

In preferred exemplary embodiments, the device comprises a seal configured to seal an area between the first profile portion and the pressure chamber.

In preferred exemplary embodiments, the seal includes two sealing ring elements which are preferably arranged on axially opposite sides of the first profile portion of the clamping ring element.

In preferred exemplary embodiments, the at least one second profile portion and the first profile portion of the clamping ring element together essentially form an L-shape. This does not exclude the possibility that other, additional and different profile portions from the L-shape may be present.

In preferred exemplary embodiments, an end portion of the at least one second profile portion remote from the first profile portion extends in the radial direction or at least transversely to the axial direction.

In preferred exemplary embodiments, the cross-sectional profile of the clamping ring element comprises two second profile portions which are preferably arranged on axially opposite sides of the first profile portion of the clamping ring element and/or each extend transversely to the first profile portion, in particular axially.

In preferred exemplary embodiments, the two second profile portions and the first profile portion of the clamping ring element together essentially form a (preferably horizontal) T-shape. This does not exclude the possibility that other, additional profile portions deviating from the T-shape may be present.

In preferred exemplary embodiments, the pressure chamber includes two pressure chamber portions which are preferably arranged on axially opposite sides of the first profile portion of the clamping ring element and are preferably assigned to one of the two second profile portions of the clamping ring element.

In preferred exemplary embodiments, each of the two pressure chamber portions is arranged radially on the inner side in relation to the respective second profile portion of the clamping ring element.

In preferred exemplary embodiments, application of pressure in the pressure chamber or the pressure chamber portion presses the at least one second profile portion of the clamping ring element radially outward, and application of pressure in the pressure chamber portions preferably presses the assigned second profile portion of the clamping ring element radially outward.

In preferred exemplary embodiments, the at least one pressure chamber portion of the pressure chamber is configured annularly circumferential in the annular housing portion of the housing element.

According to a further aspect of the present invention, an axis structure of a machine tool is proposed, comprising a housing, a shaft element of a pivot, rotary or turret axis or a spindle of the machine tool rotatably mounted in the housing, and a device for clamping the rotatably mounted shaft element according to one of the above aspects, wherein the housing element of the device is preferably torque-proof fixed to the housing of the axis structure.

DETAILED DESCRIPTION OF THE FIGURES AND PREFERRED EMBODIMENTS OF THE PRESENT INVENTION

In the following, examples or embodiments of the present invention are described in detail with reference to the attached Figures. Same or similar elements in the Figures can be designated with the same reference signs.

It should be emphasized that the invention at hand is in no way limited or restricted to the embodiments described below and their features, but further include any modifications of the embodiment, in particular those covered by modifications of the features of the examples described or by combination of one or more of the features of the examples described within the scope of protection of the independent claims.

Figure 1:
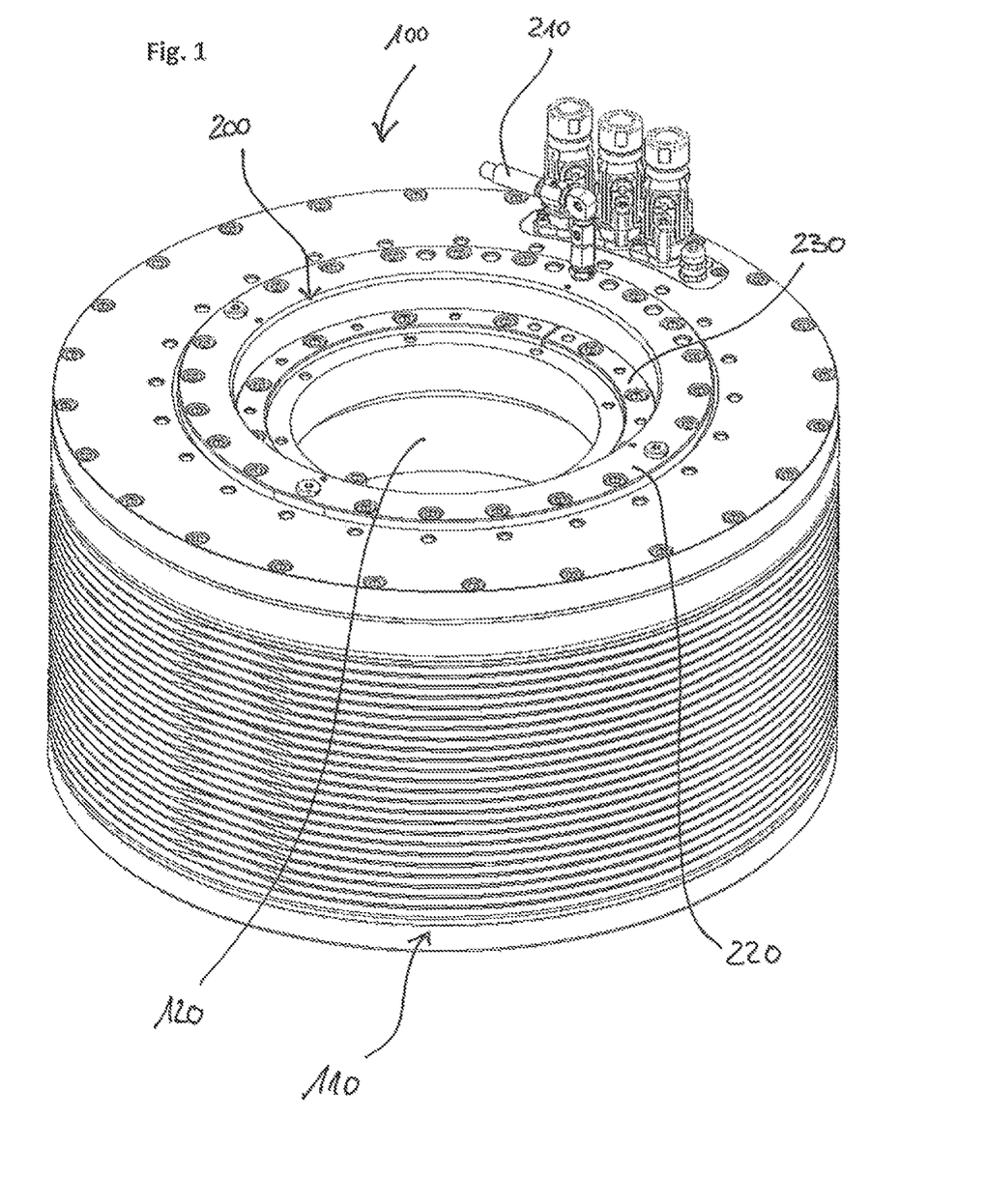
FIG. 1 shows an exemplary perspective view of a rotary axis device of a machine tool according to an exemplary embodiment of the present invention.

FIG. 1 shows an exemplary perspective view of a rotary axis device 100 of a machine tool according to an exemplary embodiment of the present invention.

FIG. 1 exemplarily shows a rotary axis device 100 of a rotary axis of a machine tool. Such a rotary axis device 100 can, for example, be used for a rotary axis of a rotatable tool table of a numerical machine tool.

However, the present invention is not limited to the use on the rotary axes of a machine tool. In other embodiments, it is also possible to provide a clamping device according to the invention on pivot, rotary or turret axes of a machine tool or on a work spindle of a machine tool.

The rotary axis device 100 exemplarily includes an outer housing 110 which, for example, is annular or essentially hollow-cylindrical. Inside the housing 110, for example, a hollow shaft element 120 is rotatably mounted.

However, the present invention is not limited to the clamping of hollow shaft elements, but can be used to clamp any rotatable shaft element, such as hollow elements or solid profile elements.

In addition, the rotary axis device 100 may have a drive device (not shown) which is arranged to rotatably drive the rotatably mounted shaft element 120 about a rotary axis, for example, by additionally provided gears or also by direct drive, for example, by a torque motor.

The rotary axis device 100 according to FIG. 1 exemplarily includes a clamping device 200 according to an embodiment of the present invention.

For example, the clamping device 200 includes an annular housing element 220 and a connection 210 (pneumatic or hydraulic connection) arranged on the annular housing element 220.

To activate the clamping or to release the clamping of the clamping device 200, the connection 210 can be connected to a pneumatic and/or hydraulic system. In preferred embodiments, the connection 210 for applying pressure can be connected to a hydraulic system, since hydraulic systems not only allow high pressures but also fast pressure transfer or pressure propagation in the system through the use of non-compressible fluids (e.g. oil or water) and thus enable activation or deactivation of the clamping mechanism for clamping or releasing the clamping connection with fast reaction times and very low delays.

Figure 2:
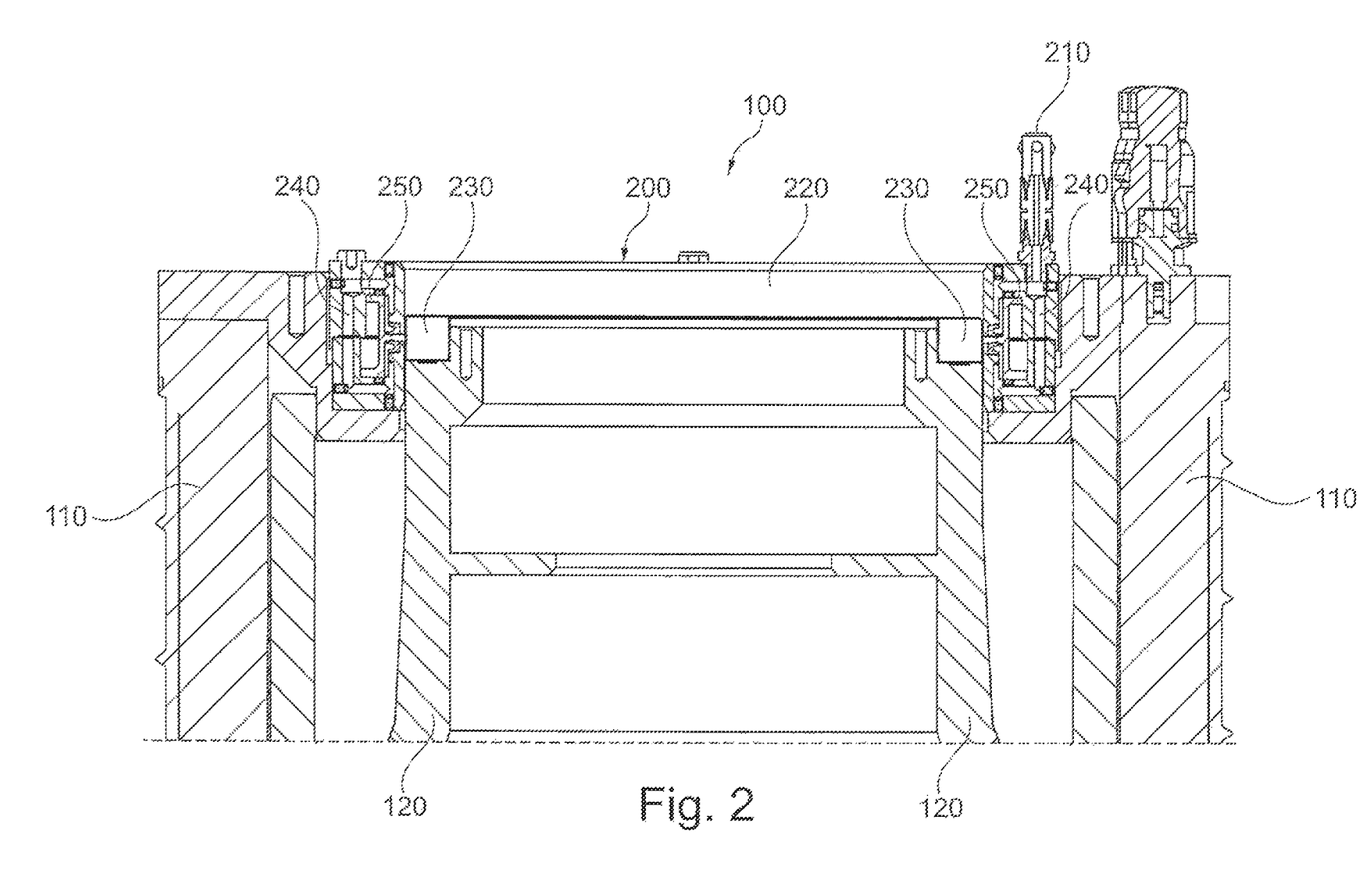
FIG. 2 shows an exemplary cross-sectional view through an upper part of the rotary axis device from FIG. 1.
Figure 3:
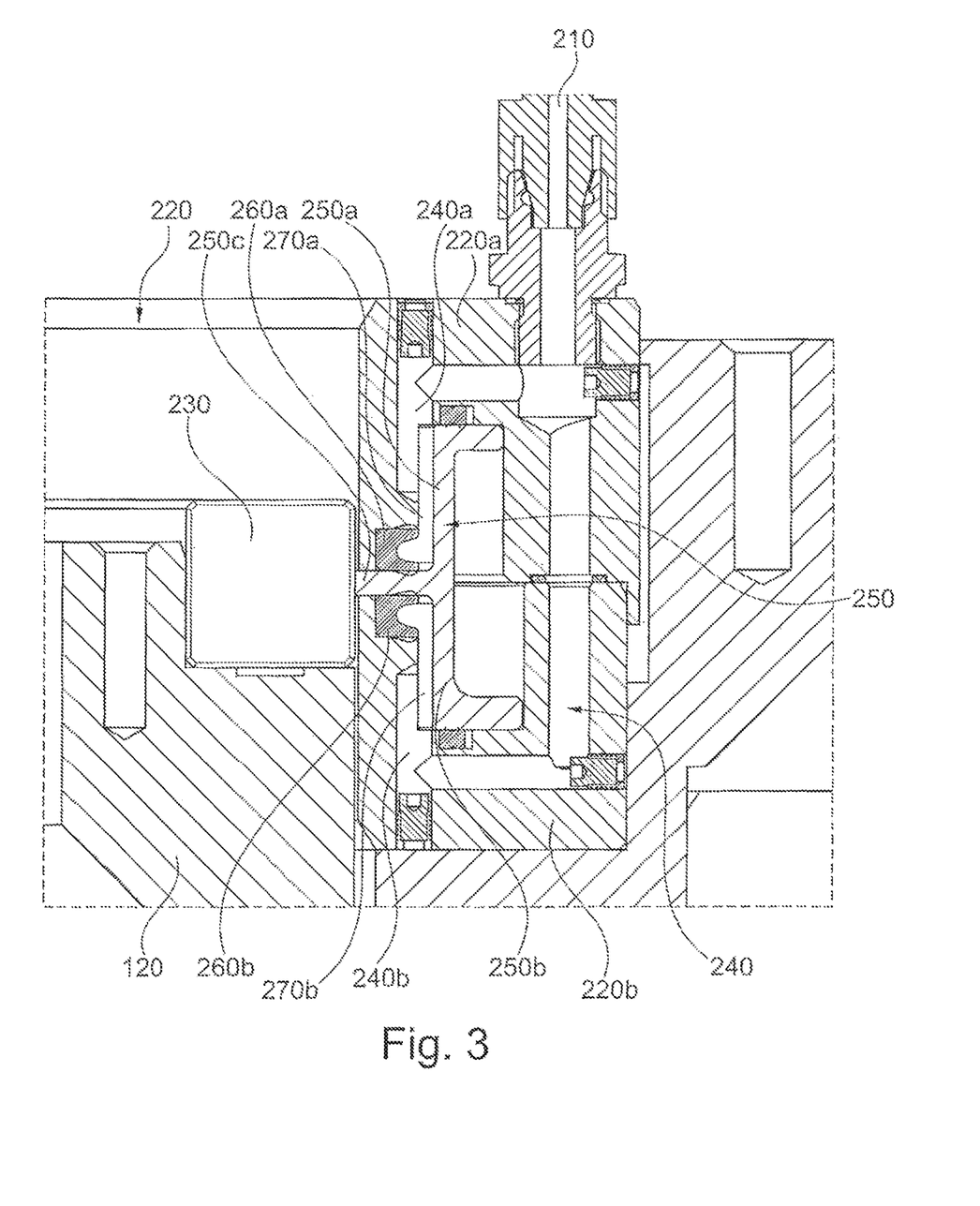
FIG. 3 shows a detailed view of a clamping device of the rotary axis device according to an embodiment of the present invention according to FIG. 2.

FIG. 2 shows an exemplary sectional view through an upper part of the rotary axis device 100 from FIG. 1 with the clamping device 200. FIG. 3 shows a detailed view of the clamping device 200 according to the embodiment of the present invention according to FIG. 2.

Figure 4:
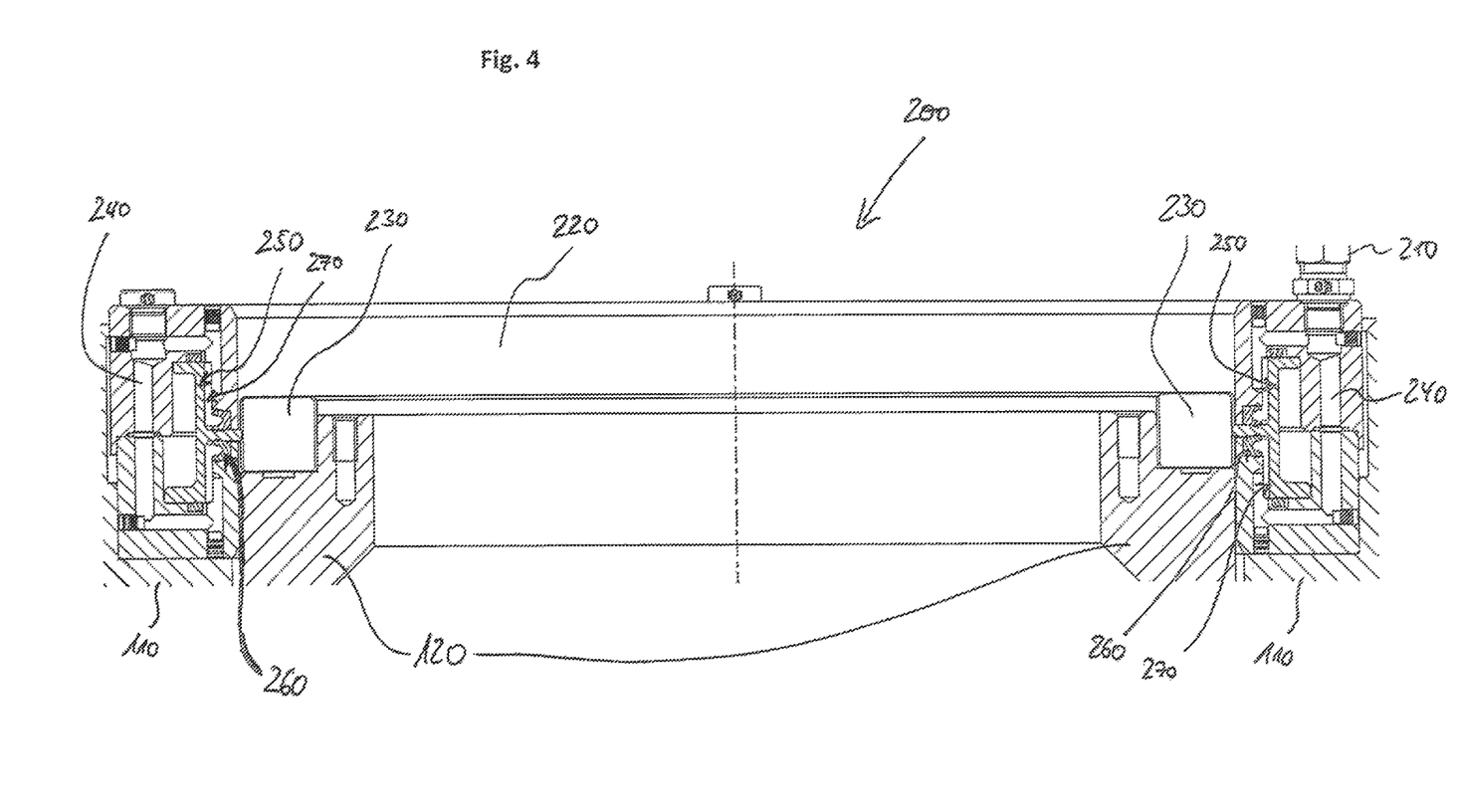
FIG. 4 shows a sectional view of an exemplary ring-shaped device for clamping a rotatably mounted shaft element in accordance with an embodiment of the present invention, which is installed in particular on the rotary axis device according to FIGS. 1 to 3.
Figure 5:
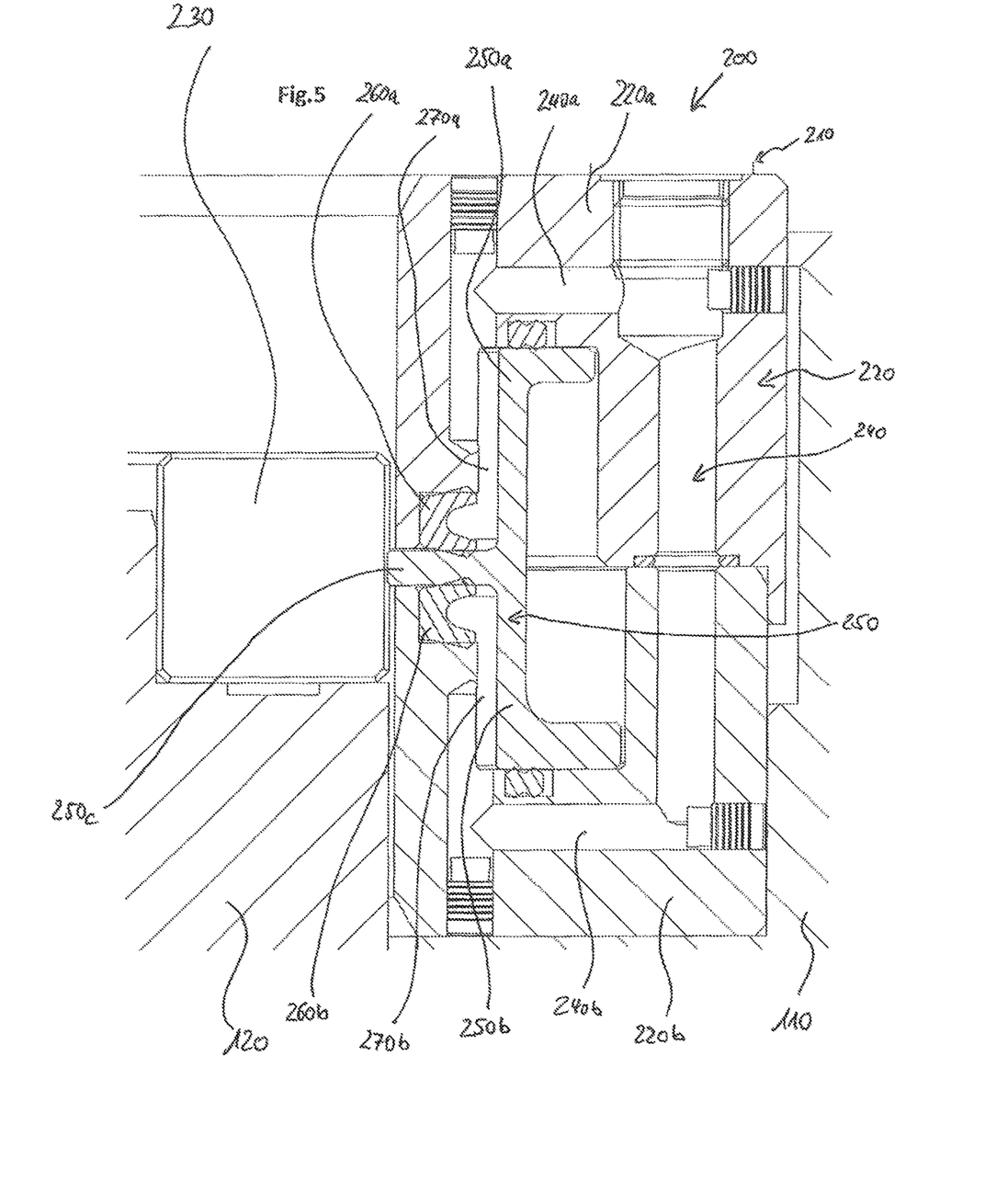
FIG. 5 shows an exemplary detailed view from FIG. 4.

FIG. 4 shows a sectional view of the exemplary annularly configured device (clamping device 200) for clamping the rotatably mounted shaft element 120 in accordance with an embodiment of the present invention which in particular is mounted or installed on the rotary axis device 100 in accordance with FIGS. 1 to 3. FIG. 5 finally shows an exemplary detail view of the clamping device 200 according to FIG. 4.

According to FIGS. 2 to 5, the clamping device 200 includes, as exemplarily shown, the housing element 220 already mentioned above, on which at least one connection 210 is arranged on the outside. This connection 210 can be connected to a pneumatic and/or hydraulic system.

Inside the housing element 220, which exemplarily is configured annularly, there are inner fluid lines 240 which are connected to the connection 210.

For example, by means of a connected pneumatic and/or hydraulic system, a pressure can be applied to the fluid lines 240 via the connection 210, for example, by means of a pressurized gas in the case of connection of a pneumatic system or, preferably, by means of a non-compressible or essentially non-compressible fluid (e.g. water and/or oil) in the case of connection of a hydraulic system.

Preferably, the housing element 220 or the fluid lines 240 in the housing element 220 are configured to enable high pressures or to withstand high pressures, in particular, for example, a hydraulic pressure greater than or equal to 100 bar, preferably greater than or equal to 120 bar.

As shown in the exemplary views of FIGS. 2 to 5, fluid lines 240 can be formed, for example, by bores in the housing element 220 which are sealed to the outside and closed with screws.

Furthermore, the housing element 220 preferably includes annular pressure chambers 270 which are connected to the fluid lines 240 so that a pressure applied to the pressure chambers 270 via the connection 210 on the fluid lines 240 is also applied to the pressure chambers 270.

In addition, in the housing element 220 an annularly circumferential clamping ring element 250 is exemplarily arranged. The clamping ring element 250 is preferably made of an elastic deformable material, in particular, an elastic deformable plastic or a hard rubber compound.

The clamping ring element 250 is exemplarily arranged radially on the outside in relation to the pressure chambers 270 and, in particular, is directly adjacent to the pressure chambers 270.

The clamping ring element 250, for example, comprises a substantially T-shaped cross-sectional portion in profile, wherein a central profile portion 250c (radial portion 250c) of the clamping ring element 250 is arranged to extend radially inward in the direction of the rotatably mounted shaft element 120, and axial profile portions 250a and 250b (axial portions 250a and 250b) respectively extend from the central profile portion 250c (radial portion 250c) of the clamping ring element 250 away from the central profile portion 250c of the clamping ring element 250 in the axial direction.

As an example, a transversely (radially) extending end portion is arranged at the axial end of or in addition to the T-shaped cross-sectional portion and in particular at the upper axial portion 250a of the clamping ring element 250, and a transversely (radially) extending end portion is arranged at the lower axial portion 250b of the clamping ring element 250 at the axial end, in order to further stabilize the overall profile of the clamping ring element 250.

Further, a first (upper) pressure chamber portion 270a of the pressure chamber 270 is arranged radially on the inner side of the upper profile portion 250a (axial portion 250a) of the clamping ring element 250, and a second (lower) pressure chamber portion 270b of the pressure chamber 270 is arranged radially on the inner side of the profile portion 250b (axial portion 250b) of the clamping ring element 250.

The central profile portion 250c (radial portion 250c) of the clamping ring element 250 extends, as an example, radially inward in the direction of the rotatably mounted shaft element 120, and extends, as an example, through an annular slot of the housing element 220 of the clamping device 200 into the hollow inner portion of the annular housing element 220 so that the central profile portion 250c (radial portion 250c) of the clamping ring element 250 is, as an example, in contact with a ring element 230 mounted, as an example, torque-proof on the rotatably mounted shaft element 120, e.g. by means of screws.

The central portion 250c (radial portion 250c) of the clamping ring element 250 also extends as an example in a radial direction between two annular sealing elements 260a and 260b of a seal 260, toward the hollow inner area of the housing element 220.

The seal elements 260a and 260b of the seal 260, as an example, are adjacent to the pressure chamber portions 270a and 270b of the pressure chamber 270 and seal these to the slot of the housing 220, through which the central profile portion 250c (radial portion 250c) of the clamping ring element 250 extends radially inward to the rotatably mounted shaft element 120 and the ring element 230, respectively.

The clamping ring or the clamping ring element 250 is preferably adapted with a production-related undersize in relation to the ring element 230 or the outer diameter of the ring element 230 so that an inner diameter of the clamping ring element 250, in particular at an innermost point of the central profile portion 250c (radial portion 250c) of the clamping ring element 250 in the rest state, is smaller than the outer diameter of the ring element 230.

Thus, the clamping ring element 250 clamps the ring element 230 frictionally in the rest state (especially without applied pressure in the pressure chamber portions 270a and 270b) with the central profile portion 250c pressed against the ring element 230.

Consequently, in the rest state of the clamping ring element 250, the ring element 230 can be clamped torque-proof over the pressed-on central profile portion 250c (radial portion 250c) of the clamping ring element 250, and thus also the shaft element 120 which is fixed torque-proof with the ring element 230.

This has the advantage that the shaft or the rotatably mounted shaft element 120 is clamped via the clamping ring element 250 in the rest state without applied pressure in the pressure chambers 270.

Experiments by the inventors have shown that a clamping torque of over 1000 Nm can be achieved in both radial and axial directions with a simple and compact structure.

In addition, there is the advantage of a very efficient safety function, since automatic safety clamping of the shaft element 120 can be guaranteed without delay in the event of failure of the pneumatic or hydraulic system or in the event of leaks or an undesirable drop in system pressure, for example to ambient pressure (e.g. external air pressure).

In addition, there is the advantage that by applying pressure via the connection 210 and the fluid lines 240 through the fluid line portions 240a and 240b into the pressure chamber portions 270a and 270b of the pressure chamber 270 without delays due to elastic deformation of the clamping ring element 250 in the radial outward direction, the clamping of the ring element 230 or via this the clamping of the rotatably mounted shaft element 120 can be achieved quickly, easily and efficiently without delay.

As an example, the clamping device 200 is constructed according to the embodiment of FIGS. 2 to 5 such that the housing element 220 has an upper annular housing portion 220a and a lower annular housing portion 220b which are fixed together in a simple manner, for example by means of screws.

By releasing the connection between the two housing portions 220a and 220b of the housing element 220, the clamping device 220 can be easily serviced or individual parts can be replaced in the event of wear.

In particular, the fluid lines 240 and the pressure chambers 270 can be cleaned easily and the clamping ring element 250 and/or the sealing elements 260a and 260b can be replaced easily and efficiently with corresponding replacement elements.

It should be noted that in the above embodiment the arrangement of the clamping ring element 250 and the pressure chamber portions 270a and 270b is configured symmetrically such that the clamping ring element 250 is located on both sides in the axial direction of the central profile portion 250c (radial portion 250c), which extends radially inward, respective upper and lower clamping ring portions 250a and 250b (axial portions 250a and 250b), each associated with a pressure chamber 270a and 270b arranged radially inward, respectively.

This has the advantage that the elastic deformation of the clamping ring element 250 can take place consistently radially outward when pressure is applied in the pressure chamber portions 270a and 270b.

However, the present invention is not limited to such embodiments in which the clamping ring element 250 in particular has an essentially T-shaped portion (with the profile portions 250a, 250b and 250c), but further embodiments are possible in which the axial portions are provided with different dimensions. In addition, embodiments are possible in which only one axial portion which extends axially away therefrom in a direction is provided from an inwardly radially extending profile portion (radial portion) of the clamping ring element 250 (e.g. the clamping ring element has an essentially L-shaped profile cross-section) and only one radially inner pressure chamber is provided with respect to the one axial portion.

In addition, it should be noted that the separately arranged ring element 230 is optional in accordance with the above configuration and further exemplary embodiments are possible in which a radially inwardly extending profile portion (radial portion) of the clamping ring element 250 is in direct contact with the rotatably mounted shaft element 120 or its outer surface and the rotatably mounted shaft element 120 can thus be directly clamped.

It should also be noted that the ring element 230 can either be provided as a fully solid ring element or as a hollow element, e.g. with an essentially rectangular or essentially square cross-section. The ring element can also be provided in a plurality of ring element segments, with or without spaces between the ring element segments.

Furthermore it should be noted that the rotary axis device 100 exemplarily shown in FIGS. 1 and 2 comprises one single clamping device 200 exemplarily only on one axial side (exemplarily on the upper side), wherein the present invention is not limited to such embodiments and further exemplary embodiments are possible in which two or more clamping devices 200 are arranged at different axial positions of the rotatably mounted shaft element.

Further exemplary embodiments are also possible, in which in a housing element of the clamping device not only one but several clamping ring elements are arranged next to each other in the axial direction, which, for example, can be pressurized simultaneously via connected fluid lines or can be pressurized independently of each other with separate fluid lines and separate pressure chambers, in order to bring these either together or independently of each other by elastic deformation radially outward from the clamping rest position (rest state) into the released position, in which the rotatable shaft is not clamped.

In summary, the present invention proposes a simple and advantageous clamping concept for clamping devices, for example for use on rotary or pivot axes of machine tools in which a rotatable shaft can be provided by pneumatically and/or hydraulically activating the clamping or the release from the clamping, wherein the clamping device can be configured to be compact, simple, cost-reducing and easy to be serviced, in particular both in the axial and in the radial direction, and wherein in addition, not only a quick change-over between clamping and releasing from the clamping be brought about, but also a high degree of safety is provided, since a fixed, frictional clamping state can be provided at high clamping torques, even in the event of a pressure drop or system pressure loss in the connected pneumatic and/or hydraulic system.

Examples and embodiments of the present invention and its advantages are described in detail above with reference to the attached Figs. It should be emphasized again that the present invention is in no way limited or restricted to the embodiments described above and their features, but that it also includes modifications of the embodiments, in particular those covered by modifications of the features of the examples described or by combination of one or more of the features of the examples described within the scope of protection of the independent claims.

REFERENCE SIGN LIST 100 rotary axis device
110 housing
120 shaft element
200 clamping device
210 connection (pneumatic or hydraulic connection)
220 housing element
220a upper housing element portion
220b lower housing element portion
230 ring element
240 fluid line (pressure line)
240a upper fluid line portion
240b lower fluid line portion
250 clamping ring element
250a upper axial portion of the clamping ring element
250b lower axial portion of the clamping ring element
250c radial portion of the clamping ring element
260 seal
260a upper sealing ring element
260b lower sealing ring element
270 pressure chamber
270a upper pressure chamber portion
270b lower pressure chamber portion

The invention claimed is:

1. A device for clamping a rotatably mounted shaft element, comprising:
a housing element having an annular housing portion, wherein the rotatably mounted shaft element can be arranged extending in axial direction through an inner region of the annular housing portion;
an elastically deformable annular clamping ring element arranged in the annular housing portion of the housing element, wherein the clamping ring element comprises a cross-sectional profile, comprising a first profile portion which extends radially inward and protrudes radially toward the rotatably mounted shaft element through an annular circumferential opening of the annular housing portion, and at least a second profile portion which extends transversely to the first profile portion;
a pressure chamber which is formed in the annular housing portion of the housing element and comprises at least one pressure chamber portion arranged radially on the inner side adjacently to the at least one second profile portion of the clamping ring element;
wherein the rotatably mounted shaft element in a rest state of the clamping ring element can be clamped by frictional connection with the first profile portion of the clamping ring element protruding towards the shaft element, and wherein the frictional connection between the shaft element and the first profile portion for releasing the clamping of the shaft element is releasable by the clamping ring element being elastically deformable radially outward by application of pneumatic or hydraulic pressure of the pressure chamber.

2. The device according to claim 1, wherein
in the rest state of the clamping ring element, an inner diameter at the first profile portion is smaller than an outer diameter of a circumferential contact portion of the shaft element or a ring element torque-proof attached to the shaft element, and the first profile portion of the clamping ring element presses against the circumferential contact portion of the shaft element or against the ring element or its ring segment elements, which is fixed torque-proof to the shaft element, for frictional connection.

3. The device according to claim 1, further comprising
a connection connectable to a pneumatic or hydraulic system which is connected to the pressure chamber for pressurization via one or more fluid lines formed in the annular housing portion of the housing element.

4. The device according to claim 1, further comprising
a seal which is configured to seal an area between the first profile portion and the pressure chamber.

5. The device according to claim 4, wherein
the seal comprises two sealing ring elements which are arranged on respective axially opposite sides of the first profile portion of the clamping ring element.

6. The device according to claim 1, wherein
the at least one second profile portion and the first profile portion of the clamping ring element together form substantially an L-shape.

7. The device according to claim 1, wherein
an end portion of the at least one second profile portion remote from the first profile portion extends in a radial direction.

8. The device according to claim 1, wherein
the cross-sectional profile of the clamping ring element comprises two second profile portions which are arranged on respective axially opposite sides of the first profile portion of the clamping ring element and each extend transversely to the first profile portion.

9. The device according to claim 8, wherein
the two second profile portions and the first profile portion of the clamping ring element together form substantially a T-shape.

10. The device according to claim 8, wherein
the pressure chamber comprises two pressure chamber portions each arranged on axially opposite sides of the first profile portion of the clamping ring element and each associated with one of the two second profile portions of the clamping ring element.

11. The device according to claim 10, wherein
each of the two pressure chamber portions is arranged radially on the inner side relative to the respective associated second profile portion of the clamping ring element.

12. The device according to claim 11, wherein
application of pressure in the pressure chamber portions respectively presses the associated second profile portion of the clamping ring element radially outward.

13. The device according to claim 1, wherein
the at least one pressure chamber portion of the pressure chamber is configured annular circumferentially in the annular housing portion of the housing element.

14. An axis structure of a machine tool comprising:
a housing,
a shaft element, rotatably mounted in the housing, of a pivot, rotary or turret axis or of a spindle of the machine tool, and
a device for clamping the rotatably mounted shaft element according to claim 1, wherein the housing element of the device is fixed torque-proof to the housing of the axis structure.

* * * * *